(12) United States Patent
Kim

(10) Patent No.: US 11,362,847 B2
(45) Date of Patent: Jun. 14, 2022

(54) METHOD, SYSTEM, AND NON-TRANSITORY COMPUTER-READABLE RECORD MEDIUM FOR PROVIDING MULTIPLE GROUP CALLS IN ONE CHATROOM

(71) Applicant: LINE Plus Corporation, Seongnam-si (KR)

(72) Inventor: Young Hyuk Kim, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 16/832,649

(22) Filed: Mar. 27, 2020

(65) Prior Publication Data

US 2020/0328907 A1    Oct. 15, 2020

(30) Foreign Application Priority Data

Apr. 12, 2019 (KR) .................. 10-2019-0043009

(51) Int. Cl.
*H04L 12/18* (2006.01)
*H04L 51/04* (2022.01)
(Continued)

(52) U.S. Cl.
CPC .......... *H04L 12/1818* (2013.01); *A63F 13/35* (2014.09); *A63F 13/795* (2014.09);
(Continued)

(58) Field of Classification Search
CPC .......... H04L 12/1818; H04L 29/06027; H04L 41/026; H04L 41/5093; H04L 29/06414;
(Continued)

(56) References Cited

U.S. PATENT DOCUMENTS

| 7,933,621 | B1* | 4/2011 | Vu ...................... H04W 8/186 455/518 |
| 2004/0198353 | A1* | 10/2004 | Quick, Jr. .............. H04W 68/08 455/435.1 |

(Continued)

FOREIGN PATENT DOCUMENTS

KR   2002-0074304 A   9/2002

*Primary Examiner* — Michael A Keller
(74) *Attorney, Agent, or Firm* — Harness, Dickey & Pierce, P.L.C.

(57) ABSTRACT

Disclosed is a method, system, and non-transitory computer-readable record medium for providing a plurality of group calls in a single chatroom. A group call providing method including receiving, by the at least one processor, information about a plurality of group call channels generated in response to a first request from at least one member included in a chatroom, from a server, providing, by the at least one processor, a group call channel list about the plurality of group call channels through the chatroom based on the information about the plurality of group call channels, and starting, by the at least one processor, a group call through a specific group call channel, from among the plurality of group call channels, in response to receiving a second request for joining the specific group call channel through the group call channel list may be provided.

19 Claims, 10 Drawing Sheets

(51) Int. Cl.

| | | |
|---|---|---|
| *H04L 67/02* | (2022.01) | |
| *H04L 12/16* | (2006.01) | |
| *H04L 65/00* | (2022.01) | |
| *H04L 51/046* | (2022.01) | |
| *G06Q 10/10* | (2012.01) | |
| *G06F 9/54* | (2006.01) | |
| *H04L 65/1101* | (2022.01) | |
| *A63F 13/35* | (2014.01) | |
| *H04L 41/026* | (2022.01) | |
| *H04L 41/50* | (2022.01) | |
| *H04L 65/403* | (2022.01) | |
| *H04N 7/14* | (2006.01) | |
| *A63F 13/795* | (2014.01) | |
| *A63F 13/87* | (2014.01) | |

(52) U.S. Cl.
CPC ............... *A63F 13/87* (2014.09); *G06F 9/54* (2013.01); *G06Q 10/10* (2013.01); *H04L 12/16* (2013.01); *H04L 12/18* (2013.01); *H04L 12/1813* (2013.01); *H04L 12/1822* (2013.01); *H04L 12/1845* (2013.01); *H04L 29/06027* (2013.01); *H04L 29/06414* (2013.01); *H04L 41/026* (2013.01); *H04L 41/5093* (2013.01); *H04L 51/04* (2013.01); *H04L 51/046* (2013.01); *H04L 65/00* (2013.01); *H04L 67/02* (2013.01); *H04N 7/147* (2013.01); *A63F 2300/556* (2013.01); *A63F 2300/572* (2013.01)

(58) Field of Classification Search
CPC ..... H04L 12/1813; H04L 67/02; H04L 12/16; H04L 65/00; H04L 12/18; H04L 51/046; H04L 12/1845; H04L 12/1822; H04L 51/04; H04N 7/147; A63F 13/795; A63F 13/87; A63F 13/35; A63F 2300/556; A63F 2300/572; G06F 9/54; G06Q 10/10

See application file for complete search history.

(56) References Cited

U.S. PATENT DOCUMENTS

| | | | |
|---|---|---|---|
| 2007/0299710 A1* | 12/2007 | Haveliwala | G06Q 10/1095 705/7.19 |
| 2008/0267095 A1* | 10/2008 | Sekaran | H04L 12/66 370/260 |
| 2009/0022103 A1* | 1/2009 | Shatsky | H04L 65/1083 370/331 |
| 2009/0296608 A1* | 12/2009 | Khan | H04L 45/54 370/260 |
| 2013/0157634 A1* | 6/2013 | McDonald | H04W 72/005 455/416 |
| 2014/0045472 A1* | 2/2014 | Sharma | H04L 63/065 455/416 |
| 2014/0112167 A1* | 4/2014 | Shuman | H04L 65/1069 370/252 |
| 2014/0267550 A1* | 9/2014 | Nimri | H04N 7/152 348/14.03 |
| 2015/0256570 A1* | 9/2015 | Joon | H04L 12/1813 370/261 |
| 2016/0174016 A1* | 6/2016 | Moon | H04W 8/005 370/329 |
| 2017/0083993 A1* | 3/2017 | Kurzman | G09B 5/06 |
| 2017/0255907 A1* | 9/2017 | Page-Romer | G06Q 50/01 |
| 2019/0088153 A1* | 3/2019 | Bader-Natal | G09B 5/065 |
| 2019/0090226 A1* | 3/2019 | Wang | H04W 72/0413 |
| 2020/0099789 A1* | 3/2020 | Miller | H04L 65/1046 |

* cited by examiner

METHOD, SYSTEM, AND NON-TRANSITORY COMPUTER-READABLE RECORD MEDIUM FOR PROVIDING MULTIPLE GROUP CALLS IN ONE CHATROOM

CROSS-REFERENCE TO RELATED APPLICATIONS

This U.S. non-provisional application and claims the benefit of priority under 35 U.S.C. § 365(c) to Korean Patent Application No. 10-2019-0043009, filed Apr. 12, 2019, the entire contents of which are incorporated herein by reference in their entirety.

BACKGROUND

Technical Field

One or more example embodiments relate to methods, systems, and/or non-transitory computer readable record media for providing a group call function in a chatting environment.

Related Art

An instant messenger that is a general communication tool refers to software capable of sending and receiving messages or data in real time. A user may register a contact on a messenger and may exchange messages with a counterpart included in a contact list in real time.

Such a messenger function is popular in a mobile environment of a mobile communication terminal as well as a personal computer (PC).

With the increasing popularity of an instant messenger and diversity of functions provided through the instant messenger, functions of sharing a variety of information and contents, such as, photos, videos, files, contacts, locations, schedules, notifications, and/or votes, and interaction with other services, such as a game service and/or a video service, are provided.

SUMMARY

Some example embodiments may provide a plurality of group calls in a single chatroom.

Some example embodiments may allow a user to selectively join a specific group call among a plurality of group calls generated in a chatroom.

Some example embodiments may generate another group call by merging at least two group calls generated in a chatroom.

Some example embodiments may provide details related to a group call through a separate page in a chatroom.

According to an example embodiment, a group call providing method implemented by a computer system including at least one processor configured to execute computer-readable instructions included in a memory, may include receiving, by the at least one processor, information about a plurality of group call channels generated in response to a first request from at least one member included in the chatroom, from a server, providing, by the at least one processor, a group call channel list about the plurality of group call channels through the chatroom based on the information about the plurality of group call channels, and starting, by the at least one processor a group call through a specific group call channel, from among the plurality of group call channels, in response to receiving a second request for joining the specific group call channel through the group call channel list.

The providing the group call channel list may include providing an add user interface (UI) for adding a new group call channel to the chatroom.

The providing the group call channel list may include constructing an item representing each of the plurality of group call channels that includes information of a member opening a corresponding group call channel, from among the plurality of group call channels or information designated by the member opening the corresponding group call channel, as a user interface.

The providing the group call channel list may include providing details that includes at least one of information of a member opening a select specific group call channel or a list of members joining the select group call channel, in response to selecting the select group call channel in the group call channel list.

The providing the group call channel list may include providing a join UI for requesting to join a select group call channel, in response to selecting the select group call channel in the group call channel list.

The providing the group call channel list may include providing state information indicating a current group call channel that is currently joined by a user of the computer system, in response to the user selecting a select group call channel in the group call channel list.

The group call providing method may further include ending a group call through the specific group call channel and allowing a user of the computer system to join a select group call channel, in response to the user selecting, while joining the specific group call channel that is different from the select group call channel, the select group call channel from the group call channel list and selecting the join UI.

The providing the group call channel list may further include providing a merge UI for requesting to merge a current group call channel that is currently joined by a user and a specific group channel different from the current call channel together, in response to the user joining the specific group call channel.

The group call providing method may further include providing, by the at least one processor, a group call details page that includes group call details according to the plurality of group call channels.

The providing the group call details page may include providing a rejoin UI for requesting to rejoin a previous group call channel that has a previous join history, through the group call details page.

An identifier may be assigned to each of the group call channels.

The identifier may be a quick response (QR) or a uniform resource locator (URL) corresponding to each of the group call channels, and the group call providing method may further include allowing, by the at least one processor, a user of the computer system to join a select group call channel, from among the plurality of group call channels, corresponding to the identifier in response to recognizing the identifier of the select group call channel.

The identifier may be designated by a member opening a corresponding group call channel, from among the plurality of group call channels, or through at least one medium associated with the chatroom.

According to an example embodiment, a non-transitory computer-readable record medium storing instructions that, when executed by the at least one processor, cause the at least one processor to perform the aforementioned group call providing method.

According to an example embodiment, a computer system may include at least one processor configured to execute computer-readable instructions included in a memory. The at least one processor may be configured to receive information about a plurality of group call channels generated in response to a first request from at least one member included in the chatroom, from a server, provide a group call channel list about the plurality of group call channels through the chatroom based on the information about the plurality of group call channels, and start a group call through a specific group call channel, from among the plurality of group call channels, in response to receiving a second request for joining the specific group call channel through the group call channel list.

Further areas of applicability will become apparent from the description provided herein. The description and specific examples in this disclosure are intended for purposes of illustration only and are not intended to limit the scope of the inventive concepts.

DETAILED DESCRIPTION

Figure 1:
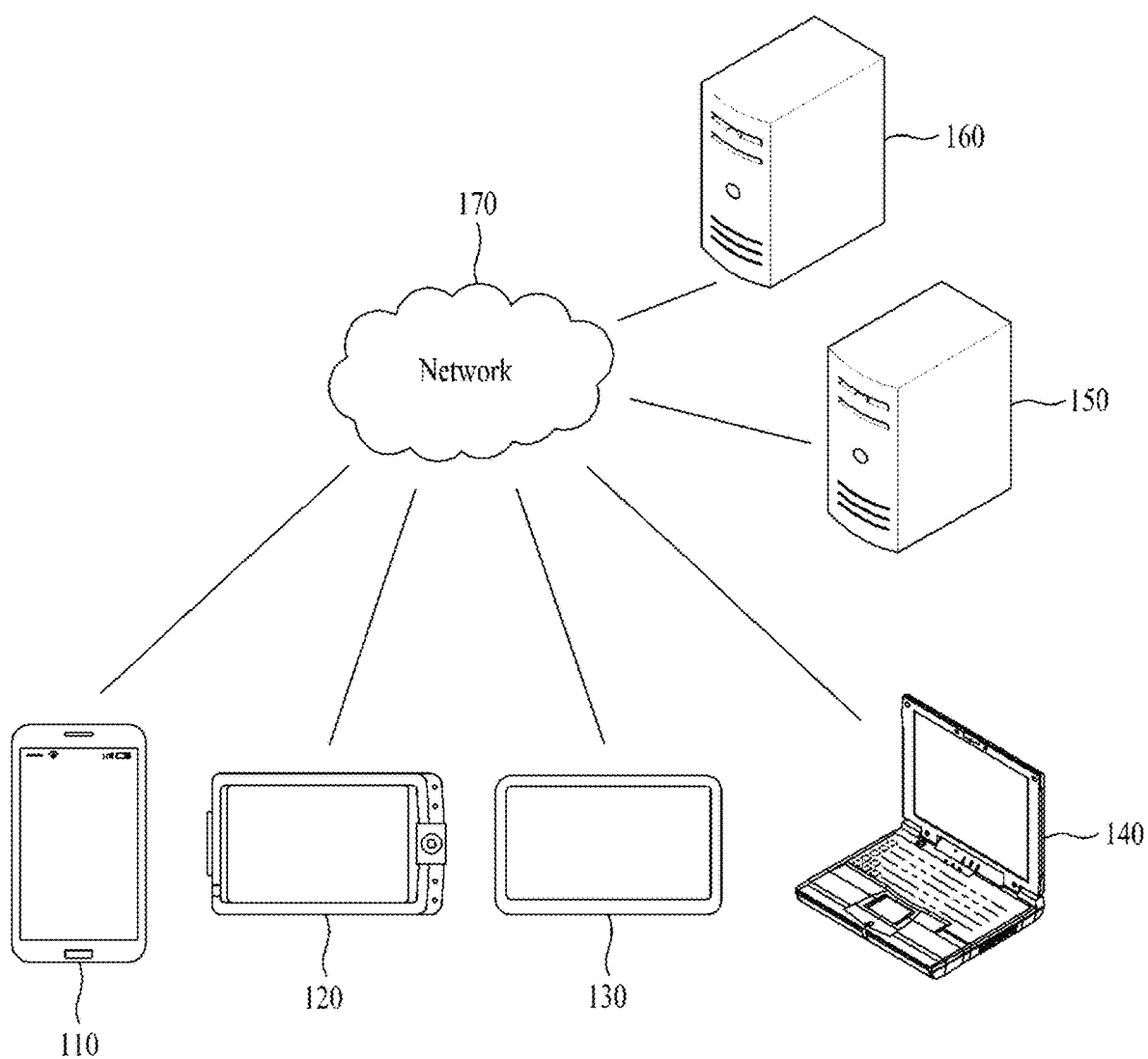
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of the inventive concepts to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be implemented as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of the example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

The example embodiments relate to technology for providing a group call function in a chatting environment.

The example embodiments in this disclosure may provide a plurality of group calls in a single chatroom, may allow a user to further easily access information in real time, and may efficiently use resources desired to provide a call between users.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, or a satellite network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 150 may provide, as the first service, a service (e.g., a messaging service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
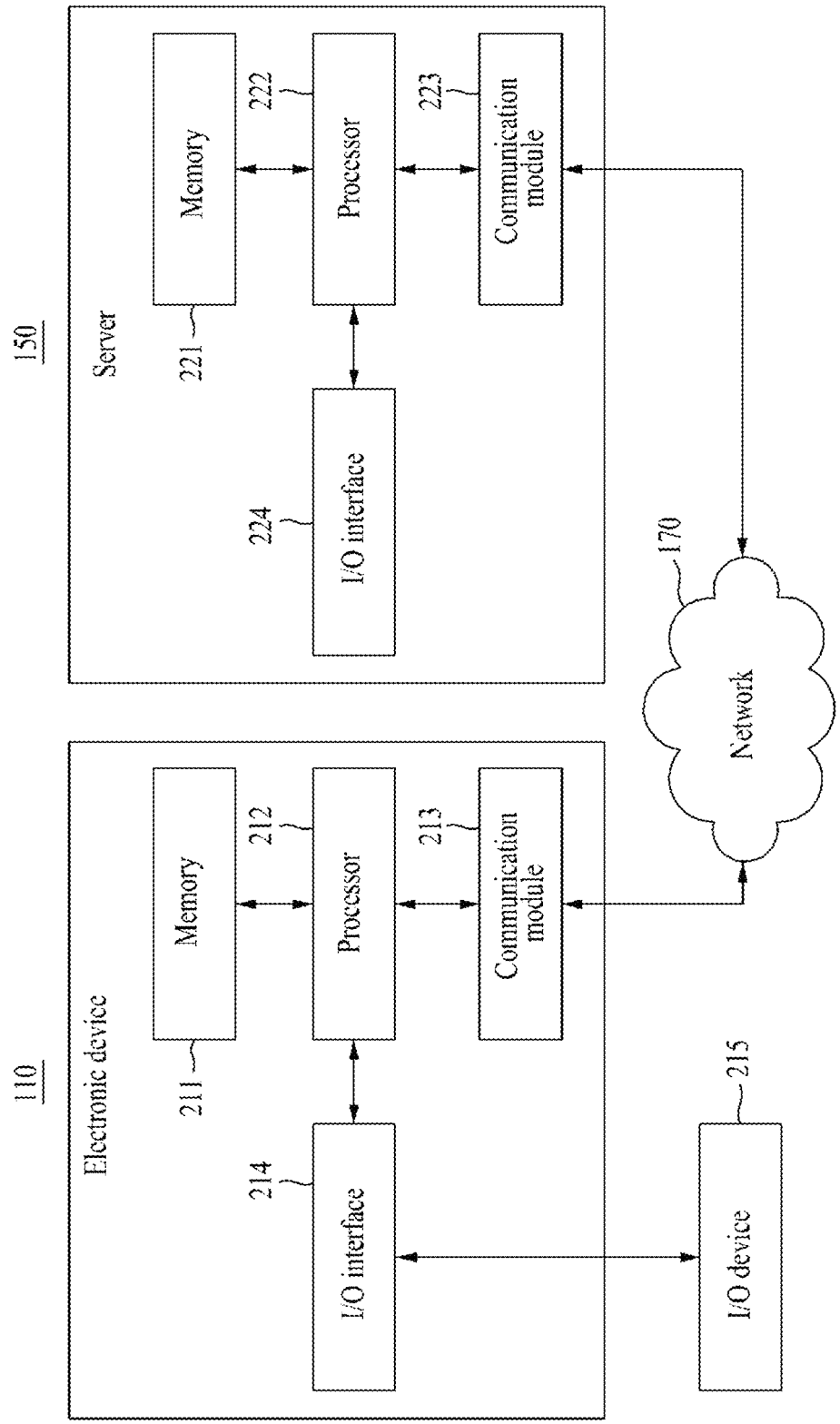
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the electronic device 110 or the server 150 as a permanent storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 with another electronic device, for example, the electronic device 120 or another server, for example, the server 160. For example, the processor 212 of the electronic device 110 may transfer a request generated based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to some example embodiments, the electronic device 110 and the server 150 may include a smaller or greater number of components than a number of components shown in FIG. 2. However, there is no need to clearly illustrate many components according to the related art. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, a method and system for providing a plurality of group calls in a single chatroom is described.

For example, a single group call is provided in a single chatroom. In response to a request for a group call in the chatroom, the group call is performed such that all of the members included in the chatroom join the group call.

In the case of a chatroom that involves a large number of members, such as an open chat, a practical conversation is impossible if all the members are joining a call. Although a small number of members actually join, resources are provided to enable a call among the entire members and it is difficult to effectively use the resources. Accordingly, there is a need for technology that may provide a plurality of group calls for a portion of members (e.g., a select number of members) as well as the entire members in a single chatroom.

The term "chatroom" used herein may refer to an interface screen for providing messages exchanged between users. For example, an interface screen for displaying messages exchanged through a communication session established between accounts of users in a messenger or a social network service (SNS) may correspond to a representative example of the chatroom.

Although the following description is made based on an example of a chatroom of a messenger, it is provided as an example only. Any type of conversation-based interfaces of a service that allows a plurality of users to join and a new user to frequently join based on an account or a telephone number of a user may apply.

Figure 3:
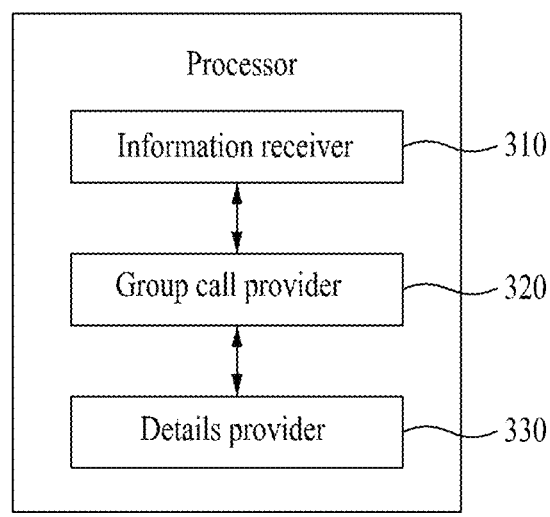
FIG. 3 is a diagram illustrating an example of components includable in a processor of an electronic device according to at least one example embodiment.
Figure 4:
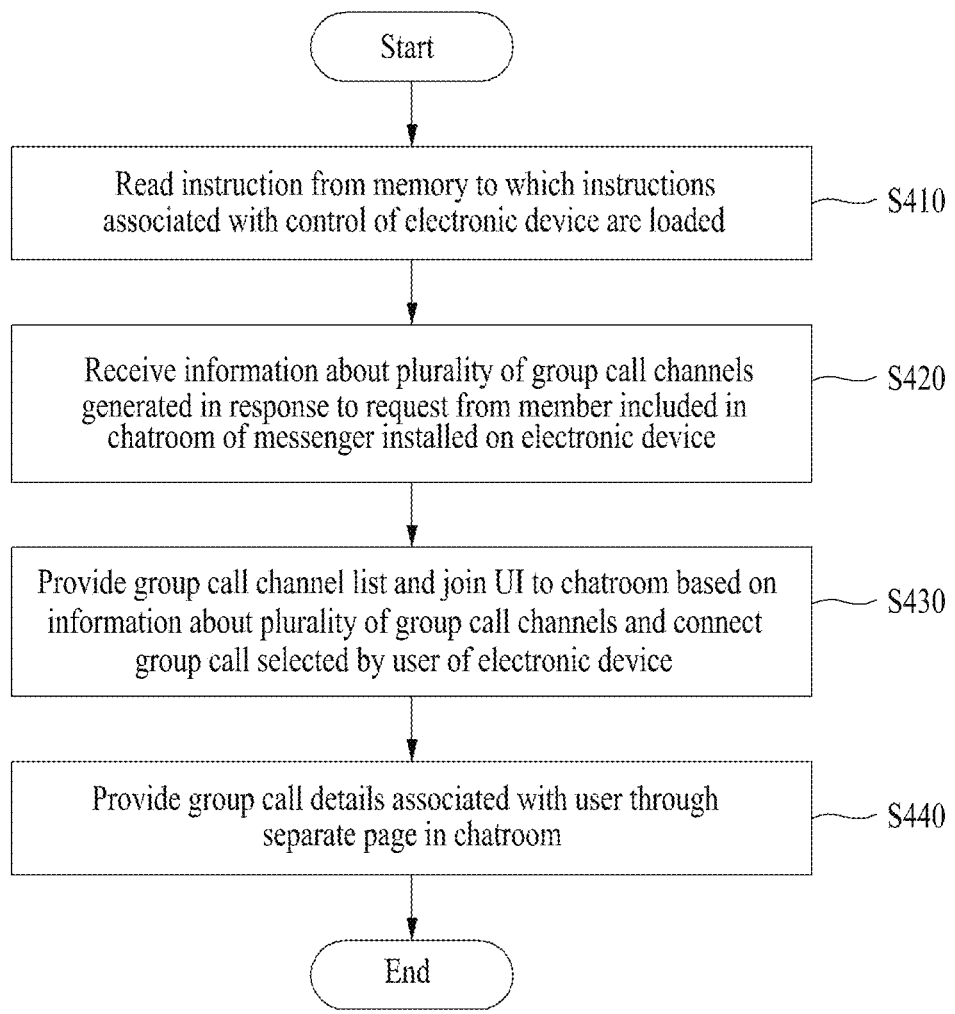
FIG. 4 is a flowchart illustrating an example of a method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A group call providing system implemented as a computer may be configured in the electronic device 110 according to some example embodiments. For example, the group call providing system may be configured in a form of a program that independently operates or may be configured in an in-app form of a specific application to be operable on the specific application. Depending on example embodiments, the group call providing system may provide a group call service through interaction with the server 150.

In response to an instruction provided from an application installed on the electronic device 110, the group call providing system configured in the electronic device 110 may perform the group call providing method of FIG. 4.

Referring to FIG. 3, to perform the group call providing method of FIG. 4, the processor 212 of the electronic device 110 may include an information receiver 310, a group call provider 320, and a details provider 330. The information receiver 310, the group call provider 320, and the details provider 330 may be functional representation of the processor 212. Depending on some example embodiments, some components of the processor 212 may be selectively included in or excluded from the processor 212. Further, depending on some example embodiments, components of the processor 212 may be implemented separately or in a merged fashion.

The processor 212 and the components of the processor 212 may control the electronic device 110 to perform operations 5410 to 5440 included in the group call providing method of FIG. 4. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 in response to an instruction (e.g., an instruction provided from an application executed on the electronic device 110) provided from a program code stored in the electronic device 110. For example, the information receiver 310 may be used as a functional representation of the processor 212 to control the electronic device 110 to receive information desired for a messaging service from the server 150 in response to the instruction.

Referring to FIG. 4, in operation 5410, the processor 212 may read a necessary instruction from the memory 211 to which instructions associated with control of the electronic device 110 are loaded. In this case, the read instruction may include an instruction for controlling the processor 212 to perform the following operations 5420 to 5440.

In operation 5420, the information receiver 310 may receive, from the server 150, information desired to provide a messaging service through a messenger installed on the electronic device 110. For example, the information receiver 310 may receive information about a plurality of group call channels generated in response to a request from a member included in a corresponding chatroom with respect to each chatroom of a messenger. The messenger according to an example embodiment may provide a group call (main group call) joined by the entire members included in a corresponding chatroom and a group call (subgroup call) joined by a portion of members included in the chatroom, with respect to each chatroom. In the case of a subgroup call, the messenger may provide a plurality of group calls in a single chatroom. In response to receiving a request for a subgroup call from an electronic device, for example, the electronic device 110, of at least one member included in a chatroom, the server 150 may generate a channel for the subgroup call corresponding to the request and may send a message indicating opening of a subgroup call channel instead of directly connecting the subgroup call. Here, the server 150 may send the message indicating opening of the subgroup call channel to the entire members included in the chatroom or to a member specified for the subgroup call. The server 150 may generate a subgroup call channel based on a unique number (ID) of the chatroom and may assign an identifier to each subgroup call channel. The message indicating opening of the subgroup call channel may include an identifier of the subgroup call channel. Thus, the group call providing method may allow a user to join a select group call channel corresponding to a select identifier in response to recognizing the select identifier of the group call channel, for example, from a message indicating opening of the group call channel. Here, a method that identifies a corresponding subgroup call channel and enables immediate join may use, for example, a quick response (QR) code or a uniform resource locator (URL) as the identifier. Therefore, the information receiver 310 may receive information about a plurality of subgroup calls generated in response to a request from a member included in a corresponding chatroom with respect to each chatroom of the messenger. The received information may include information (e.g., a name, an ID, a profile, and a nickname) of a member that opens a subgroup call, a list of members that joins the subgroup call, and the like, for each subgroup call. Further, the received information may include an identifier of each subgroup call channel.

In operation 5430, the group call provider 320 may provide a subgroup call channel list generated in a corresponding chatroom with respect to each chatroom of the messenger based on information about the plurality of subgroup call channels received in operation 5420 and a user interface (hereinafter, referred to as a join UI) for requesting to join a specific group call channel selected from the subgroup call channel list. The user of the electronic device 110 may select a subgroup call that the user desires to join from among subgroup call channels in the chatroom as a member included in the chatroom and then request a group call through the join UI. Here, in response to a selection from the user on a specific group call, that is, a subgroup call channel that the user desires to join among the subgroup call channels, the group call provider 320 may provide information (e.g., a name, an ID, and/or a profile) of a member that opens the subgroup call and a list of members that join the subgroup call as information about the selected subgroup call channel. The group call provider 320 may receive, from the user of the electronic device 110, a request for joining the specific group call among the subgroup call channels in the chatroom through the join UI and may provide a group call service through the subgroup call channel corresponding to the join request received from the user.

According to some example embodiments, it is possible to provide a plurality of subgroup calls in a single chatroom. Accordingly, the user may select a specific group call from among the plurality of subgroup calls provided in the chatroom and may join the selected specific group call.

In operation 5440, in response to receiving a request for reading group call details from the user of the electronic device 110 in the chatroom, the details provider 330 may provide group call details according to the subgroup call channel generated in the corresponding chatroom through a separate page.

The details provider 330 may manage a list of subgroup call channels previously generated in the chatroom or a list of subgroup call channels previously joined by the user, and may provide details related to a group call through a group call details page in response to a reading request from the user.

The group call details page may include a list of subgroup call channels previously generated in a corresponding chatroom or a list of subgroup call channels previously joined by the user, and may include a rejoin UI for rejoining a currently closed subgroup call channel or a subgroup call channel currently not joined by the user, however, previously joined by the user.

The details provider 330 may request the server 150 to reopen a subgroup call channel requested by the user to rejoin. Accordingly, in response to the rejoin request from the user, the server 150 may generate a new subgroup call channel and may send an invitation message to rejoin the new subgroup call channel to existing members of the subgroup call corresponding to the rejoin request.

Figure 5:
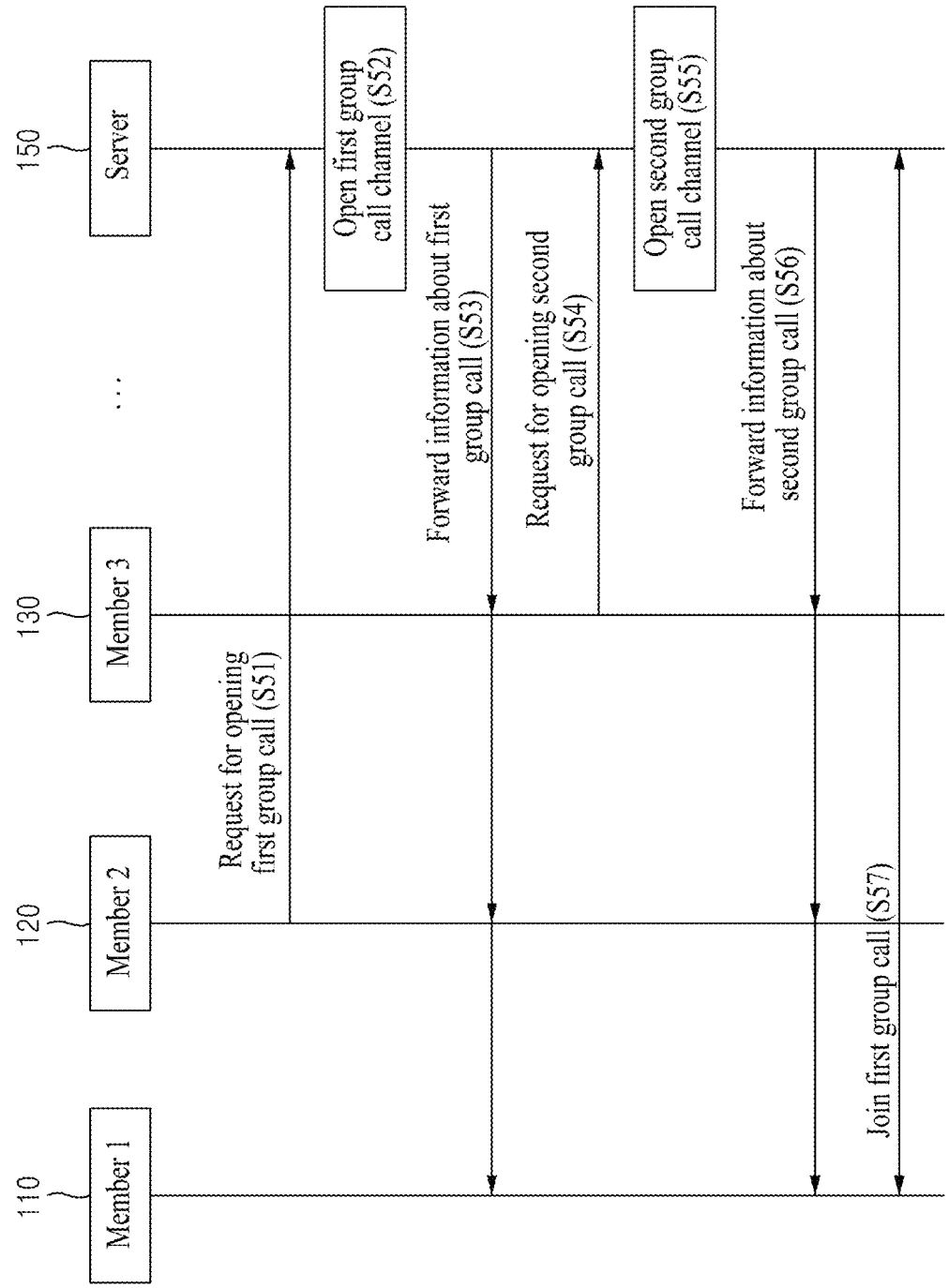
FIG. 5 illustrates an example of a process of providing a plurality of subgroup calls in a single chatroom according to at least one example embodiment.

FIG. 5 illustrates an example of a process of providing a plurality of subgroup calls in a single chatroom according to at least one example embodiment.

A group chatroom that includes member 1, member 2, member 3, and the like is provided as an example.

Referring to FIG. 5, in operation S51, the server 150 receives a request for opening a first subgroup call from the electronic device 120 of the member 2 in the chatroom. The member 2 may directly set a name of the first subgroup call and may also specify a member to join a corresponding group call. Further, the member 2 may set a password, a number of members to join, and the like, as requirements to join the first subgroup call. The requirements set or specified by the member 2 may be included in the request for opening and forwarded to the server 150.

In operation S52, the server 150 may open a first subgroup call channel by generating a channel for the first subgroup call requested by the member 2 to open. Here, the server 150 may initially send a message indicating opening of the first subgroup call channel instead of directly connecting the first subgroup call. The server 150 may send a message indicating opening of the first subgroup call channel, that is, an invitation message to join the first subgroup call to the entire members included in the chatroom or a member specified for the first subgroup call. The server 150 may identify the first subgroup call channel based on a QR code or a URL for the first subgroup call channel and may assign an identifier that allows immediate join. The identifier of the first subgroup call channel may be designated by the member 2 or may be posted through at least one medium associated with the chatroom. In addition to a member included in the chatroom, any person may join the first subgroup call using the identifier posted through the medium.

When the first subgroup call channel is open, the server 150 may forward information about the first subgroup call to the entire members included in the chatroom in operation S53. Information about the first subgroup call may include, for example, a name designated for the first subgroup call, information (e.g., a name, an ID, and/or a profile) of the member that opens the first subgroup call, and a list of members that join the first subgroup call.

The member 3 in the chatroom may request opening of a second subgroup call as an additional subgroup call channel. In response thereto, the server 150 may open a second subgroup call channel through operation S54 to S56 in the same manner as a process including operations S51 to S53. Therefore, the server 150 may generate a plurality of subgroup call channels with respect to a single chatroom by repeating the above process.

The electronic devices 110, 120, and 130 of the member 1, the member 2, and the member 3 may provide a UI for the first subgroup call and a UI for the second subgroup call based on the information about the first and the second subgroup calls received from the server 150.

In operation S57, in response to receiving a request for joining the first subgroup call from the electronic device 110 of the member 1 in the chatroom, the server 150 may allow an account of the member 1 to join the first subgroup call channel. A member in the chatroom may select and join a desired group call among a plurality of subgroup calls generated in the corresponding chatroom.

FIGS. 6 to 9 illustrate examples of a chatroom that provides a plurality of subgroup calls according to at least one example embodiment.

FIGS. 6 to 9 illustrate examples of a chatroom screen displayed on the electronic device 110. Here, a chatroom 600 that includes 103 members including the user of the electronic device 110 is provided as an example.

Figure 6:
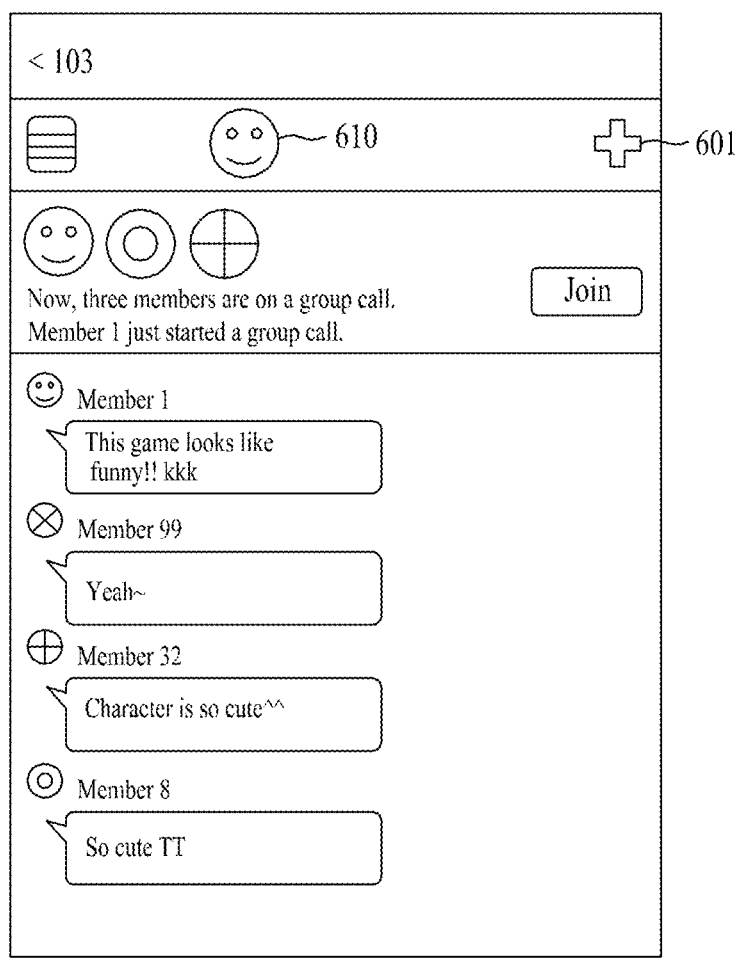
FIGS. 6 to 9 illustrate examples of a chatroom that provides a plurality of subgroup calls according to at least one example embodiment.

Referring to FIG. 6, the chatroom 600 may include a subgroup call list 610 that includes at least one subgroup call channel opened by a member in the chatroom 600, and may also include an add UI 601 for opening an additional subgroup call channel.

The subgroup call list 610 may be configured as a UI in which an item representing each subgroup call channel includes information (e.g., a name, an ID, a profile, and/or a nickname) of a member opening a corresponding subgroup call channel or information (e.g., a channel name) designated by the member opening the subgroup call channel. The subgroup call list 610 may include an item representing each subgroup call channel and a number of members joining each subgroup call channel.

A member in the chatroom 600 may additionally open a new subgroup call channel in addition to subgroup call channels included in the subgroup call list 610 using the add UI 601 in the chatroom 600.

Figure 7:
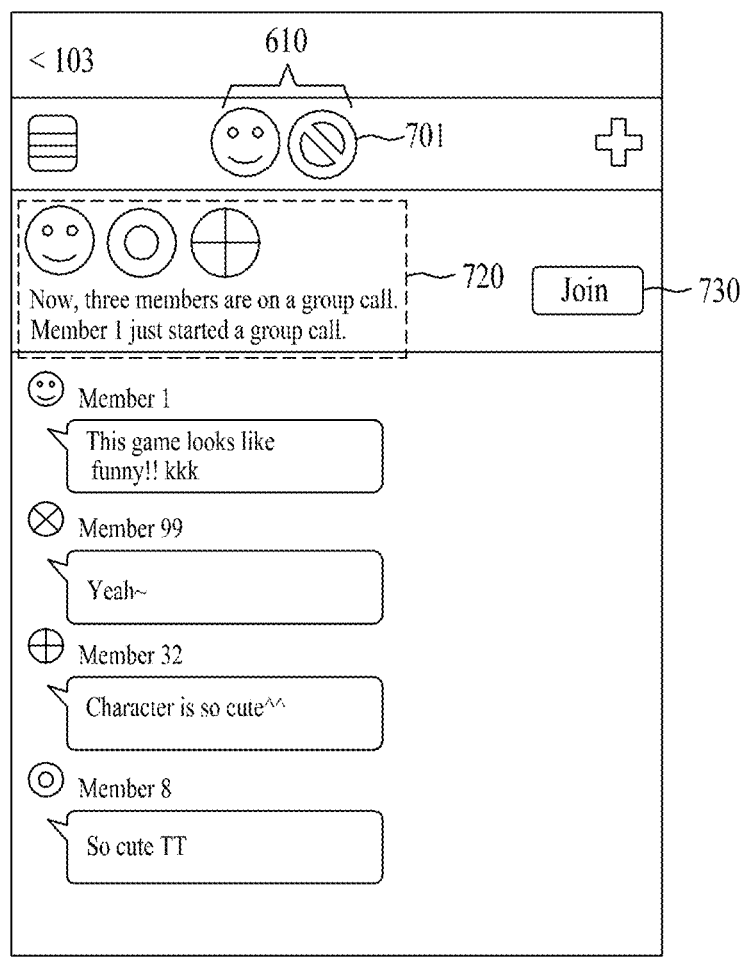

Referring to FIG. 7, when a new subgroup call channel is opened by the member in the chatroom 600, an item 701 representing the opened new subgroup call channel may be added to the subgroup call list 610.

In response to a selection from the user of the electronic device 110 on a specific subgroup call, that is, a subgroup call channel in the subgroup call list 610, details 720 including at least one of information (e.g., a name, an ID, and/or a profile) of a member opening a corresponding subgroup call or a list of members joining the subgroup call may be displayed on the chatroom 600 as information about the selected subgroup call channel.

In a state in which the specific subgroup call is selected in the subgroup call list 610, a join UI 730 for requesting to join the selected subgroup call may be activated in the chatroom 600.

A user may select a single subgroup call from the subgroup call list 610, may verify information about the subgroup call channel from the details 720, and may join the subgroup call through the join UI 730.

As described above, a member in the chatroom 600 may directly join a subgroup call through the join UI 730 in the chatroom 600. Further, a member may directly join a subgroup call in response to a message indicating opening of a subgroup call channel or using an identifier of the subgroup call channel posted through other media. A member to join a group call may be designated in advance at a point in time at which opening of a corresponding subgroup call channel is requested. In some example embodiments, when the subgroup call channel is opened, another member may be invited thereto by a member opening the corresponding subgroup call channel or members therein.

Figure 8:
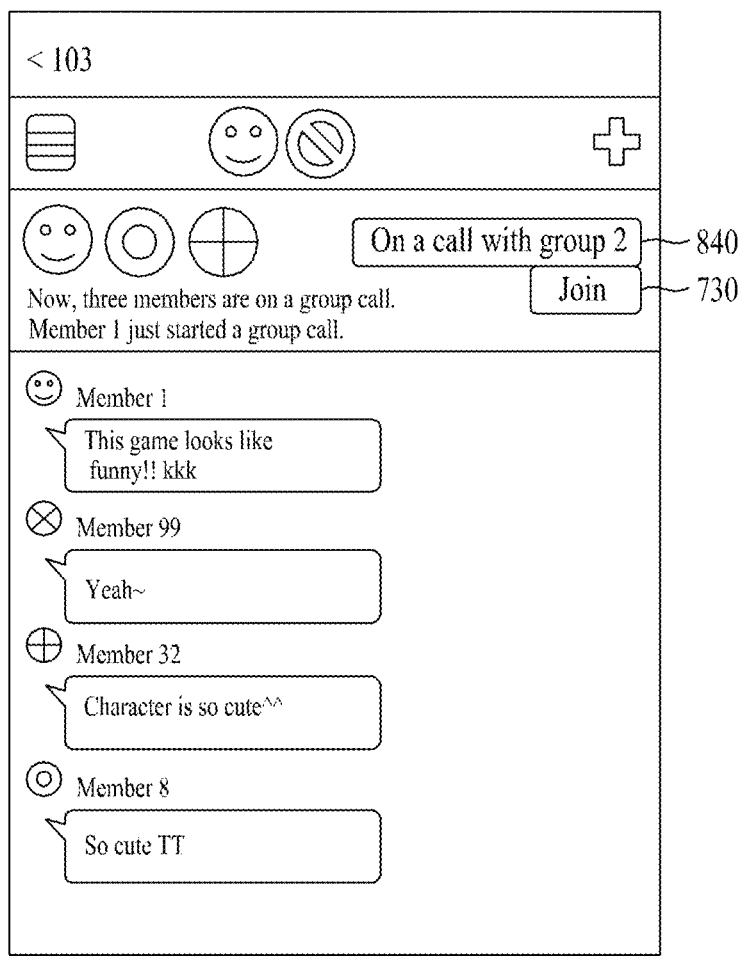

Referring to FIG. 8, when a user is trying to join a single subgroup call, state information 840 indicating another subgroup call that is currently joined by the user may be displayed. The state information 840 may include information about a currently joining subgroup call channel. In other words, in response to a user selecting a select subgroup call (or a select group call channel) in the group call channel list, the state information 840 including information about another subgroup all (or a current group call) that is currently joined by the user may be displayed.

In response to a selection from the user on another subgroup call through the subgroup call list 610 while joining a single subgroup call, the join UI 730 for requesting to join the another subgroup call selected from the subgroup call list 610 may be displayed on the chatroom 600 with the state information 840. In response to the selection from the user on the another subgroup call channel from the subgroup call list 610 and the input of the join UI 730, in a state in which the single subgroup call has been joined by the user, the existing group call (e.g., the single subgroup call) may be ended and the user may be allowed to join the selected new subgroup call (e.g., the another subgroup call). In other words, a group call through a current group call channel may be ended and the user may be allowed to join a select group call channel, in response to a user selecting, while joining a current group call channel that is different from the another group call channel, the select group call channel from the group call channel list and selecting the join UI.

Figure 9:
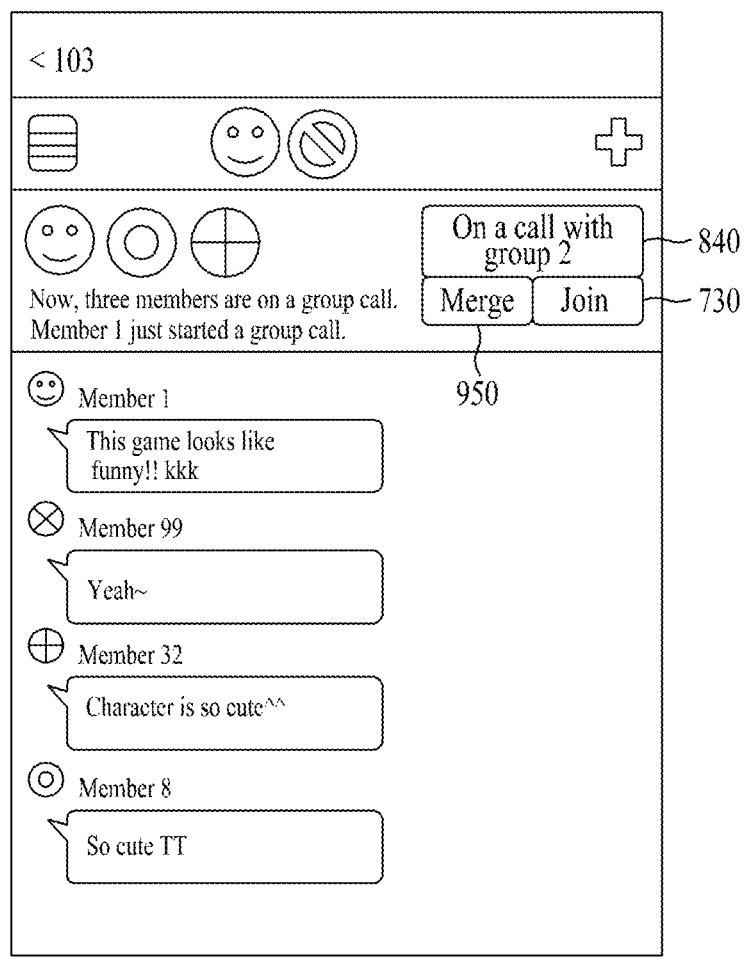

As another example, referring to FIG. 9, in response to a selection from the user on another subgroup call through the subgroup call list 610 while joining a specific subgroup call through the subgroup call list 610, the join UI 730 for requesting to join the specific subgroup call selected from the subgroup call list 610 and a merge UI 950 for merging the specific subgroup call channel and the another subgroup call channel selected from the subgroup call list 610 together may be displayed in the chatroom with the state information 840.

The electronic device 110 may forward the channel merge request from the user through the merge UI 850 to the server 150 with information about the subgroup call channel the user is currently joining and the subgroup call channel selected form the subgroup call list 610. In response thereto, the server 150 may merge the currently joining subgroup call channel and the newly selected subgroup call channel into a single channel or may generate a new channel. In other words, the server 150 may merge to merge a current group call channel, which is currently joined by a user, and another group call channel different from the current group call channel together, in response to the user joining the another group call channel. Also, the server 150 may send an invitation message to the currently joining subgroup call channel, the newly selected subgroup call channel, or the new subgroup call channel to members joining the two subgroup call channels, or may allow the members joining the two subgroup call channels to automatically join the merged subgroup call channel or the new subgroup call channel.

Figure 10:
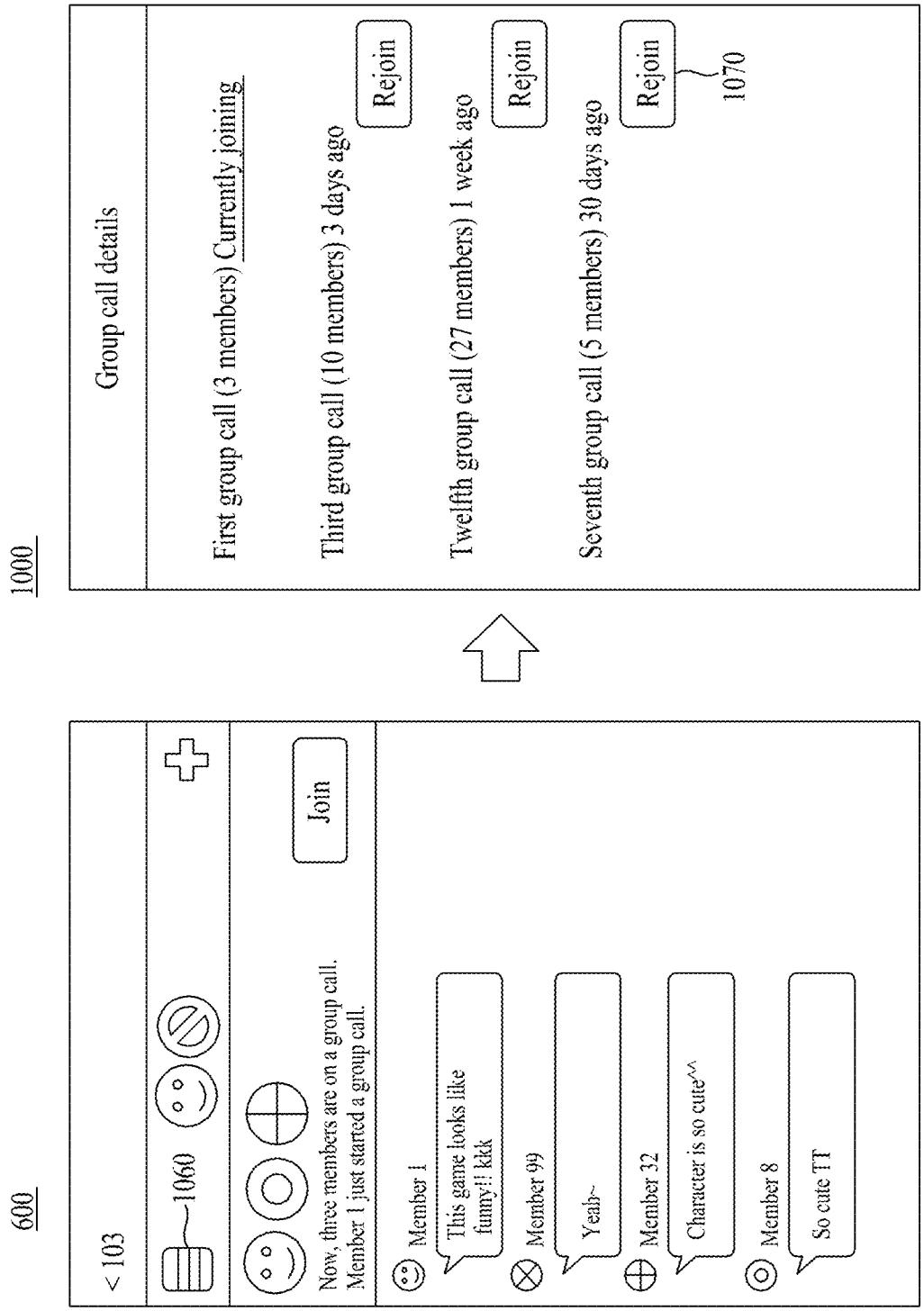
FIG. 10 illustrates an example of a subgroup call details page according to at least one example embodiment.

FIG. 10 illustrates an example of a subgroup call details page according to at least one example embodiment.

Referring to FIG. 10, the chatroom 600 including at least one subgroup call channel may further include a details UI 1060 for requesting to read group call details. The electronic device 110 may provide a group call details page 1000 as a layer screen or a separate interface screen on the chatroom 600 in response to an input of the details UI 1060 in the chatroom 600.

The group call details page 1000 may include a list of subgroup call channels previously generated in the chatroom 600 or a list of subgroup call channels previously joined by the user, and may include a rejoin UI 1070 for rejoining a currently closed subgroup call channel or a subgroup call channel not currently joined by the user, however, previously joined by the user.

If the user desires to make a call again with a previous group call member, the user may request channel reopening through the rejoin UI 1070 in the group call details page 1000. Here, the electronic device 110 may request the server 150 to reopen a subgroup call channel requested by the user to rejoin. In response to the channel reopening request, the server 150 may generate a new subgroup call channel and may send an invitation message to join the new subgroup call channel to the existing members of the subgroup call channel requested by the user to rejoin.

In response to a selection from the user on one of group call channels displayed on the group call details page 1000, the server 150 may display details of a corresponding group call, such as, for example, a list of users having a join history in the corresponding group call, a call duration, a call summary, etc.

Also, the server 150 may calculate statistical information about a group call associated with the chatroom 600, for example, a group call having a largest number of members, a group call having a longest call duration, and the like, in the chatroom 600, and may provide the calculated statistical information through the group call details page 1000.

According to some example embodiments, it is possible to provide a plurality of subgroup calls in a single chatroom. A user may select a specific group call from among the plurality of subgroup calls generated in the chatroom and may join the selected specific group call. Also, it is possible to generate another group call by merging at least two group calls generated in the chatroom, to provide details related to a group call through a separate page in the chatroom, and to reopen a group call channel with a previous group call member.

The systems or apparatuses described above may be implemented using hardware components, and/or a combination of hardware components and software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A group call providing method implemented by a computer system comprising at least one processor configured to execute computer-readable instructions included in a memory, the method comprising:

receiving, by the at least one processor, information about a plurality of subgroup call channels generated in response to a first request from at least one member included in a chatroom, from a server, each of the subgroup call channels corresponding to one of subgroups each joined by a portion of members included in the chatroom;

providing, by the at least one processor, a group call channel list about the plurality of subgroup call channels through the chatroom based on the information about the plurality of subgroup call channels; and starting, by the at least one processor, a group call through a specific subgroup call channel, from among the plurality of subgroup call channels, in response to receiving a second request for joining the specific subgroup call channel through the group call channel list, wherein the group call channel list includes a current subgroup call channel that is currently joined by a user of the computer system and another subgroup call channel different from the current subgroup call channel, and the providing the group call channel list comprises providing state information indicating a state of the current subgroup call channel, in response to the user selecting another subgroup call channel, together with a user interface for joining the another subgroup call channel and terminating the current subgroup call channel.

2. The method of claim 1, wherein the providing the group call channel list comprises providing an add user interface (UI) for adding a new subgroup call channel to the chatroom.

3. The method of claim 1, wherein the providing the group call channel list comprises constructing an item representing each of the plurality of subgroup call channels that includes information of a member opening a corresponding subgroup call channel, from among the plurality of subgroup call channels, or information designated by the member opening the corresponding subgroup call channel, as a user interface.

4. The method of claim 1, wherein the providing the group call channel list comprises providing details that include at least one of information of a member opening a select subgroup call channel or a list of members joining the select subgroup call channel in response to selecting the select subgroup call channel in the group call channel list.

5. The method of claim 1, wherein the providing the group call channel list comprises providing a join UI for requesting to join the another subgroup call channel in response to selecting the another subgroup call channel in the group call channel list.

6. The method of claim 5, further comprising:
ending a current group call through the current subgroup call channel and allowing the user of the computer system to join the another subgroup call channel as the specific subgroup call channel, in response to the user selecting the another subgroup call channel from the group call channel list and selecting the join UI.

7. The method of claim 5, wherein the providing the group call channel list further comprises providing a merge UI for requesting to merge the current subgroup call channel and the another subgroup call channel together, in response to the user joining the another subgroup call channel as the specific subgroup call channel.

8. The method of claim 1, further comprising:
providing, by the at least one processor, a group call details page that includes group call details according to the plurality of subgroup call channels in response to the user selecting a user interface, in the chatroom for loading the group call details page as a separate page.

9. The method of claim 8, wherein the providing the group call details page comprises providing a rejoin UI for requesting to rejoin a previous subgroup call channel that has a previous join history, through the group call details page.

10. The method of claim 1, wherein an identifier is assigned to each of the subgroup call channels.

11. The method of claim 10, wherein
the identifier is a quick response (QR) or a uniform resource locator (URL) corresponding to each of the subgroup call channels, and
the group call providing method further comprises allowing, by the at least one processor, the user of the computer system to join a select subgroup call channel, from among the plurality of subgroup call channels, corresponding to the identifier in response to recognizing the identifier of the select subgroup call channel.

12. The method of claim 10, wherein the identifier is designated by a member opening a corresponding subgroup call channel, from among the plurality of subgroup call channels, or through at least one medium associated with the chatroom.

13. A non-transitory computer-readable record medium storing instructions that, when executed by at least one processor, cause the computer system to perform the group call providing method of claim 1.

14. A computer system comprising:
at least one processor configured to execute computer-readable instructions included in a memory, the at least one processor configured to cause the computer system to,
receive information about a plurality of subgroup call channels generated in response to a first request from at least one member included in a chatroom, from a server, each of the subgroup call channels corresponding to one of subgroups each joined by a portion of members included in the chatroom;
provide a group call channel list about the plurality of subgroup call channels through the chatroom based on the information about the plurality of subgroup call channels; and
start a group call through a specific subgroup call channel, from among the plurality of subgroup call channels, in response to receiving a second request for joining the specific subgroup call channel through the group call channel list,
wherein the group call channel list includes a current subgroup call channel that is currently joined by a user of the computer system and another subgroup call channel different from the current subgroup call channel, and
the at least one processor is further configured to cause the computer system to provide the group call channel list such that state information indicating a state of a current subgroup call channel is provided, in response to the user selecting the another subgroup call channel, together with an user interface for joining the another subgroup call channel and terminating the current subgroup call channel.

15. The computer system of claim 14, wherein the at least one processor is further configured to provide an add user interface (UI) for adding a new subgroup call channel to the chatroom.

16. The computer system of claim 14, wherein the at least one processor is further configured to construct an item representing each of the plurality of subgroup call channels that includes information of a member opening a corresponding subgroup call channel, from among the plurality of subgroup call channels, or information designated by the member opening the corresponding subgroup call channel, as a user interface.

17. The computer system of claim 14, wherein the at least one processor is further configured to provide a join UI for requesting to join the another subgroup call channel as the specific subgroup call channel in response to selecting the another subgroup call channel in the group call channel list.

18. The computer system of claim 14, wherein the at least one processor is further configured to provide a merge UI for requesting to merge the current subgroup call channel and the another subgroup call channel together, in response to the user joining the another subgroup call channel as the specific subgroup call channel.

19. The computer system of claim 14, wherein the at least one processor is further configured to provide a group call details page that includes group call details according to the plurality of subgroup call channels in response to the user selecting a user interface, in the chatroom for loading the group call details page as a separate page.

* * * * *